United States Patent
Cooley et al.

(10) Patent No.: US 9,077,538 B1
(45) Date of Patent: Jul. 7, 2015

(54) SYSTEMS AND METHODS FOR VERIFYING USER IDENTITIES

(75) Inventors: Shaun Cooley, El Segundo, CA (US); Paul Agbabian, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 210 days.

(21) Appl. No.: 13/326,745

(22) Filed: Dec. 15, 2011

(51) Int. Cl.
*H04L 29/06* (2006.01)
*H04L 9/32* (2006.01)

(52) U.S. Cl.
CPC .......... *H04L 9/3213* (2013.01); *H04L 63/0884* (2013.01); *H04L 63/0815* (2013.01); *H04L 63/0861* (2013.01)

(58) Field of Classification Search
CPC ................................. G06F 21/31; G06F 21/41
USPC ......................................................... 726/4–8
See application file for complete search history.

(56) References Cited

U.S. PATENT DOCUMENTS

| | | | | |
|---|---|---|---|---|
| 8,468,576 B2 * | 6/2013 | Doman et al. | ..................... | 726/1 |
| 2009/0187962 A1 * | 7/2009 | Brenneman et al. | .............. | 726/1 |
| 2010/0037046 A1 * | 2/2010 | Ferg et al. | ...................... | 713/155 |
| 2010/0132043 A1 * | 5/2010 | Bjorn et al. | ...................... | 726/25 |
| 2010/0138311 A1 * | 6/2010 | Pieraldi et al. | ................... | 705/26 |
| 2012/0005733 A1 * | 1/2012 | Ross | .................................. | 726/6 |
| 2012/0005739 A1 * | 1/2012 | Kassaei | ............................ | 726/8 |
| 2013/0097682 A1 * | 4/2013 | Zeljkovic et al. | ................. | 726/7 |
| 2013/0160144 A1 * | 6/2013 | Mok et al. | ....................... | 726/29 |

* cited by examiner

*Primary Examiner* — Justin T Darrow
*Assistant Examiner* — Hee Song
(74) *Attorney, Agent, or Firm* — ALG Intellectual Property, LLC

(57) ABSTRACT

A computer-implemented method for verifying user identities may include (1) identifying a request to ascertain whether a user account corresponds to a physical person, and, in response to the request, (2) identifying a password vault configured to store login information for at least one third-party Internet site for the user account, the third-party Internet site requiring a physical validation factor to log in to the third-party Internet site, (3) determining, based at least in part on the login information for the third-party Internet site, that the user account corresponds to the physical person, and (4) responding to the request with an indicator that the user account corresponds to the physical person. Various other methods, systems, and computer-readable media are also disclosed.

20 Claims, 6 Drawing Sheets

| User ID Field 410 | Password Field 412 | Website Field 414 | Successful Logins Field 416 | Last Attempt Field 418 | Last Successful Attempt Field 420 |
|---|---|---|---|---|---|
| jbloggs71 | abc123 | hotmail.com | 483 | 04-01-2009 | 04-01-2009 |
| jbloggs71 | abc123 | yahoo.com | 783 | 06-13-2011 | 06-13-2011 |
| jqbloggs@gmail.com | buffal0 | amazon.com | 290 | 12-22-2011 | 12-22-2011 |
| Hammer_man | zyx321 | myspace.com | 103 | 04-01-2009 | 04-01-2009 |
| jqbloggs | 0000385134U3613 | salliemae.com | 72 | 06-28-2010 | 07-03-2008 |
| jbloggs | bUffal0 | bankofamerica.com | 55 | 01-05-2012 | 01-05-2012 |
| jqbloggs | buffal0 | google.com | 1438 | 01-19-2012 | 01-19-2012 |
| 424-555-3811 | buffal0 | t-mobile.com | 16 | 09-07-2011 | 09-07-2011 |
| jbloggs | buffal0 | facebook.com | 1138 | 01-16-2012 | 01-16-2012 |
| jqbloggs | Buffal0% | visa.com | 88 | 01-10-2012 | 01-10-2012 |

Records: 430, 432, 434, 436, 438, 440, 442, 444, 446, 448

SYSTEMS AND METHODS FOR VERIFYING USER IDENTITIES

BACKGROUND

People increasingly rely on the Internet for business and personal use. As individuals and organizations provide more services via the Internet, there arise more opportunities for malicious parties to exploit these services to illegitimate ends. For example, malicious parties may propagate spam, malware, phishing attacks, and/or misleading information. In another example, malicious parties may consume resources provided by resources intended for legitimate users.

In some cases, the cost of exploiting Internet services and resources may be small or even negligible for the malicious parties compared to the harm done and/or the potential gain for the malicious parties. For example, a malicious party may use multiple bots, automated agents, and/or zombie systems to exploit Internet services and resources. Alternatively, a malicious party may manually register multiple fake accounts to exploit an Internet service or resource. Because some Internet services may be designed with and/or operate on the assumption that each registered account represents a unique user, these services may reduce potential exploits by better differentiating between unique people and redundant or fake accounts. Unfortunately, traditional approaches for identifying unique people may prove either insufficient (e.g., using email validations) or overly intrusive (e.g., requiring a credit card authorization). Accordingly, the instant disclosure identifies and addresses a need for additional and improved systems and methods for verifying user identities.

SUMMARY

As will be described in greater detail below, the instant disclosure generally relates to systems and methods for verifying user identities by mining password vaults for evidence of successful logins to Internet sites that require strong validation techniques. In one example, a computer-implemented method for performing such a task may include (1) identifying a request to ascertain whether a user account corresponds to a physical person, and, in response to the request, (2) identifying a password vault configured to store login information for at least one third-party Internet site for the user account, the third-party Internet site requiring a physical validation factor to log in to the third-party Internet site, (3) determining, based at least in part on the login information for the third-party Internet site, that the user account corresponds to the physical person, and (4) responding to the request with an indicator that the user account corresponds to the physical person.

In some examples, the login information may include information indicating that a user of the user account has successfully logged in to the third-party Internet site. In these examples, the password vault may be configured to reset the information indicating that the user of the user account has successfully logged in to the third-party Internet site when the login information changes. In some embodiments, the login information may include information indicating a number of times that a user of the user account has successfully logged in to the third-party Internet site.

The physical validation factor may include any of a variety of factors. For example, the physical validation factor may include credit card information, in-person authentication, phone number authentication, a document scan, a home address verification, and/or biometric data.

In some embodiments, determining that the user account corresponds to the physical person may include (1) identifying a weight assigned to the third-party Internet site, (2) applying the weight in a multi-factor determination of whether the user account corresponds to the physical person, and (3) determining, in the multi-factor determination, that a likelihood that the user account corresponds to the physical person exceeds a predetermined threshold. Additionally or alternatively, determining that the user account corresponds to the physical person may include determining that the third-party Internet site requires the physical validation factor by (1) identifying a database of third-party Internet sites that require physical validation factors and (2) querying the database to determine that the third-party Internet site requires the physical validation factor.

In one embodiment, a system for implementing the above-described method may include (1) an identification module programmed to identify a request to ascertain whether a user account corresponds to a physical person, (2) a vault module programmed to, in response to the request, identify a password vault configured to store login information for at least one third-party Internet site for the user account, the third-party Internet site requiring a physical validation factor to log in to the third-party Internet site, (3) a determination module programmed to determine, based at least in part on the login information for the third-party Internet site, that the user account corresponds to the physical person, and (4) a response module programmed to respond to the request with an indicator that the user account corresponds to the physical person. The system may also include at least one processor configured to execute the identification module, the vault module, the determination module, and the response module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to ascertain whether a user account corresponds to a physical person, and, in response to the request, (2) identify a password vault configured to store login information for at least one third-party Internet site for the user account, the third-party Internet site requiring a physical validation factor to log in to the third-party Internet site, (3) determine, based at least in part on the login information for the third-party Internet site, that the user account corresponds to the physical person, and (4) respond to the request with an indicator that the user account corresponds to the physical person.

As will be explained in greater detail below, by mining password vaults for evidence of successful logins to Internet sites that require strong validation techniques, the systems and methods described herein may effectively validate the authenticity of user accounts (e.g., that they represent physical people) without burdening users with requirements to repeat strong validation tests.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

FIG. 4 is a diagram of an exemplary password vault.

Figure 1:
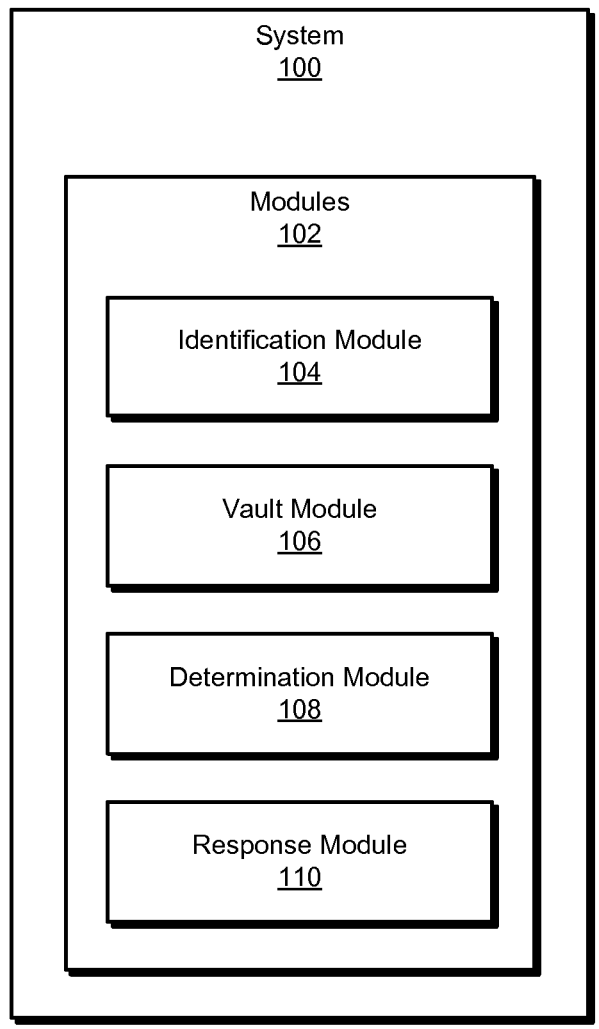
FIG. 1 is a block diagram of an exemplary system for verifying user identities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
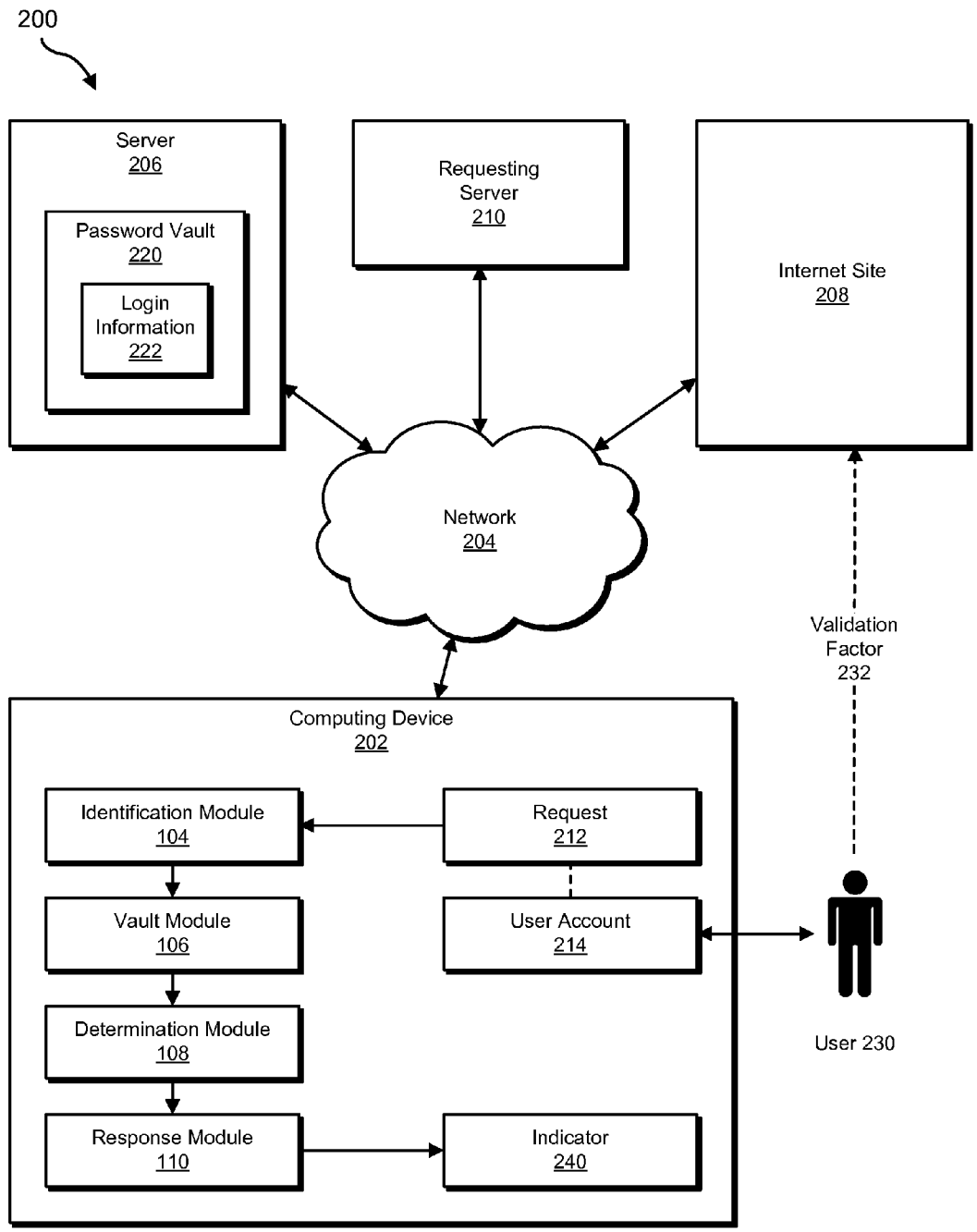
FIG. 2 is a block diagram of an exemplary system for verifying user identities.

The following will provide, with reference to FIGS. 1-2, detailed descriptions of exemplary systems for verifying user identities. Detailed descriptions of corresponding computer-implemented methods will also be provided in connection with FIG. 3. Detailed descriptions of an exemplary password vault will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for verifying user identities. As illustrated in this figure, exemplary system 100 may include one or more modules 102 for performing one or more tasks. For example, and as will be explained in greater detail below, exemplary system 100 may include an identification module 104 programmed to identify a request to ascertain whether a user account corresponds to a physical person. Exemplary system 100 may also include a vault module 106 programmed to, in response to the request, identify a password vault configured to store login information for at least one third-party Internet site for the user account that requires a physical validation factor to log in to the third-party Internet site. Exemplary system 100 may additionally include a determination module 108 programmed to determine, based at least in part on the login information for the third-party Internet site, that the user account corresponds to the physical person.

In addition, and as will be described in greater detail below, exemplary system 100 may include a response module 110 programmed to respond to the request with an indicator that the user account corresponds to the physical person. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, Internet site 208, and requesting server 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206, an Internet site 208, and a requesting server 210 via a network 204. For example, requesting server 210 may wish to validate a user account corresponding to computing device 202 as representing a unique physical person.

In one embodiment, one or more of modules 102 from FIG. 1 may, when executed by at least one processor of computing device 202, facilitate computing device 202 in verifying user identities. For example, and as will be described in greater detail below, one or more of modules 102 may cause computing device 202 to (1) identify a request (e.g., a request 212 from requesting server 210) to ascertain whether a user account (e.g., a user account 214) corresponds to a physical person (e.g., a user 230), and, in response to the request, (2) identify a password vault (e.g., a password vault 220 on server 206) configured to store login information (e.g., login information 222) for at least one third-party Internet site (e.g., Internet site 208) for the user account that requires a physical validation factor (e.g., a validation factor 232) to log in to the third-party Internet site, (3) determine, based at least in part on the login information for the third-party Internet site, that the user account corresponds to the physical person (e.g., determine, based on login information 222, that user account 214 corresponds to user 230), and (4) respond to the request with an indicator that the user account corresponds to the physical person (e.g., respond to request 212 with an indicator that user account 214 corresponds to user 230).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of hosting, maintaining, storing, and/or providing login information for one or more Internet sites. Examples of server 206 include, without limitation, application servers and database servers configured to provide various database services and/or run certain software applications.

Internet site 208 generally represents any type or form of server, Internet service, Internet resource, and/or Internet portal with which a user may maintain an account and/or to which a user may log in to access one or more features, services, and/or resources. Examples of Internet site 208 include, without limitation, financial service institution portals, commerce portals, governmental portals, and the like.

Requesting server 210 generally represents any type or form of computing device that is capable of hosting one or more resources, providing one or more services, tracking information about one or more users, and/or requesting information about one or more users. Examples of requesting server 210 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
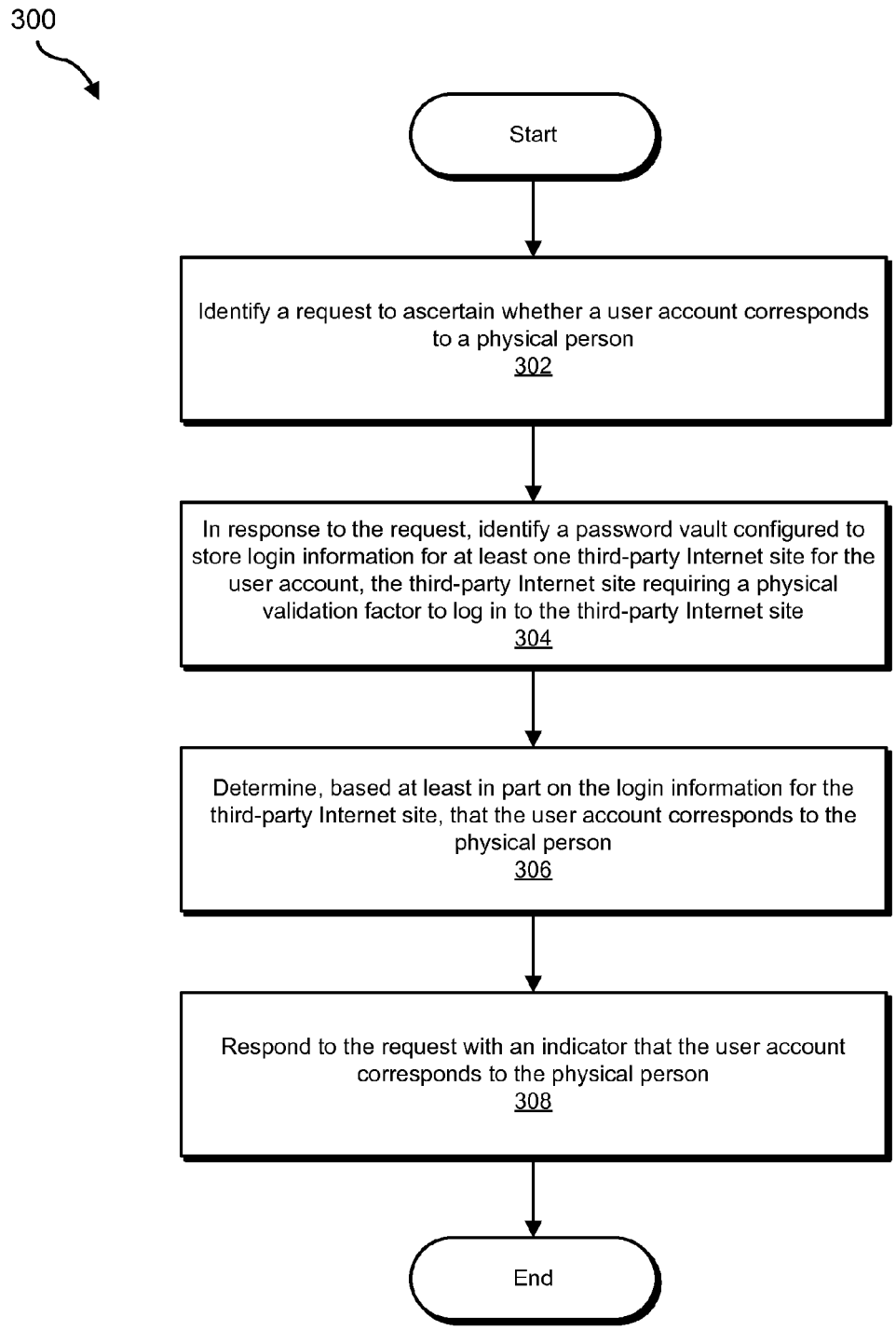
FIG. 3 is a flow diagram of an exemplary method for verifying user identities.

FIG. 3 is a flow diagram of an exemplary computer-implemented method 300 for verifying user identities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to ascertain whether a user account corresponds to a physical person. For example, at step 302 identification module 104 may, as part of computing device 202 in FIG. 2, identify request 212 (e.g., from requesting server 210) to ascertain whether user account 214 corresponds to user 230 (e.g., any unique physical person).

As used herein, the phrase "user account" may refer to any identifier that may correspond to a physical person. In some examples, the user account may be configured to interface with a physical person. Additionally or alternatively, the user account may make a representation (explicit or implicit) to a service that it corresponds to a physical person. In some examples, the user account may include an account on a client device operated by a user. Additionally or alternatively, the user account may include an account created and/or recorded on a remote site for accessing one or more computing resources and/or services. In some examples, the phrase "user account" may refer to a transitory identifier and/or state information, such as an Internet session. Additionally or alternatively, the phrase "user account" may refer to an identifier of a computing device and/or a network address potentially corresponding to and/or used by a person. In some examples, the user account may be temporary, incomplete, and/or incipient. For example, the user account may represent an account a user is in the process of creating and/or attempting to create with a service.

As used herein, the phrase "physical person" generally refers to an individual who owns, controls, creates, and/or is represented by a user account. In some examples, the request may entail a request to determine that the user account is not controlled by a bot, an automated agent, and/or a zombie system. Additionally or alternatively, the request may entail a request to determine that the user account uniquely represents the physical person. In some examples, the request may entail a request to determine that the user account is not an illegitimate account and/or represented with false information.

Identification module 104 may identify the request in any of a variety of contexts. For example, the request may originate from a service that a user of the user account has attempted to access. Additionally or alternatively, the request may originate from a data gathering system (e.g., a ratings system and/or a reputation system) configured to evaluate users and/or data elements with which users interact.

Returning to FIG. 3, at step 304 one or more of the systems described herein may identify a password vault configured to store login information for at least one third-party Internet site for the user account that requires a physical validation factor to log in to the third-party Internet site. For example, at step 304 vault module 106 may, as part of computing device 202 in FIG. 2 and in response to request 212, identify password vault 220 on server 206 configured to store login information 222 for Internet site 208 for user account 214. In this example, Internet site 208 may require a validation factor 232 to log in.

As used herein, the phrase "password vault" may refer to any database, system, data store, for storing information relating to logging in one or more Internet sites. For example, the password vault may store a tuple for each Internet site. The tuple may include a uniform resource locator for the Internet site, a user name and/or identifier, a password, and/or past login statistics. In some examples, the password vault may be secured and/or encrypted. In some examples, the password vault may implement and/or include one or more data integrity mechanisms (e.g., digital signatures) to prevent undetected tampering with the contents of the password vault. In some examples, the password vault may be configured to facilitate logging in to Internet sites represented within the password vault and, in the process, to collect information relating to login attempts.

As used herein, the phrase "login information" may refer to any information relating to logging in one or more Internet sites. For example, the phrase "login information" may refer to a uniform resource locator for the Internet site, a user name and/or identifier, a password, and/or past login statistics. In some examples, the login information may include information indicating that a user of the user account has successfully logged in to the third-party Internet site. In these examples, the password vault may be configured to reset the information indicating that the user of the user account has successfully logged in to the third-party Internet site when the login information changes (e.g., when a username and/or password associated with the third-party Internet site changes within the password vault). In some examples, the login information may include information indicating a number of times that a user of the user account has successfully logged in to the third-party Internet site.

FIG. 4 illustrates an exemplary password vault 400. As shown in FIG. 4, exemplary password vault 400 may include records 430, 432, 434, 436, 438, 440, 442, 444, 446, and 448. Password vault 400 may also include a user ID field 410, a password field 412, a website field 414, a successful logins field 416, a last attempt field 418, and a last successful attempt field 420. Successful logins field 416 may represent a number of times that a user of the user account has successfully logged in to an Internet site. For example, record 434 may show that the user account has successfully logged in to amazon.com 290 times. Last attempt field 418 may represent the most recent time that a login for an Internet site was attempted. For example, record 444 may show that the user account last attempted to log in to t-mobile.com on Sep. 7, 2011. Last successful attempt field 420 may represent the most recent time that a login for an Internet site was successful. In some examples, last successful attempt field 420 may match last attempt field 418. For example, record 430 may show that the user account last attempted to log in to hotmail.com on Apr. 1, 2009 and that an attempt on the same date (e.g., the same attempt) was successful. Alternatively, last successful attempt field 420 may not match last attempt field 418. For example, record 438 may show that the user account last attempted to log in to salliemae.com on Jun. 28, 2010, but that the last successful attempt to log in to salliemae.com was on Jul. 3, 2008 (e.g., because an account with salliemae.com was discontinued, because the password expired and was never updated in the password vault, etc.).

As used herein, the phrase "Internet site" may refer to any type or form of server, Internet service, Internet resource, and/or Internet portal with which a user may maintain an account and/or to which a user may log in to access one or more features, services, and/or resources. Examples of Internet sites include, without limitation, financial service institution portals (e.g., a bank, a credit card company, a lending company, an investment company, etc.), commerce portals (e.g., for business partnerships, shopping, micropayments, etc.), governmental portals (e.g., for the Internal Revenue Service), and the like.

As used herein, the phrase "physical validation factor" may refer to any factor that may be used by an Internet site to confirm that a user account corresponds to a physical person and/or a unique individual. In some examples, the phrase "physical validation factor" may refer to an out-of-band, non-computer-mediated, and/or real world authentication factor. Additionally or alternatively, the phrase "physical validation factor" may refer to a validation factor that implicitly includes and/or depends on an out-of-band, non-computer-mediated, and/or real world authentication factor.

In one example, the physical validation factor may include credit card information. For example, an Internet site may require that a user submit a name and credit card number. The Internet site may thereby verify that the user has access to credit card information, and rely on the hurdles to secure illegitimate credit card information to infer that the user represents a legitimate, physical person. In another example, the physical validation factor may include in-person authentication. For example, a user may only gain access to an Internet site after meeting with a representative of an owner of the Internet site in person. In another example, the physical validation factor may include phone number authentication. For example, an Internet site may require that a user submit a phone number and place an automated call to the phone number, requiring a predetermined response (e.g., touchtone instructions given to the user) in order to validate that the user represents a legitimate, physical person. In another example, the physical validation factor may include a document scan (e.g., a scan of a birth certificate, a driver's license, etc.). In an additional example, the physical validation factor may include a home address verification (e.g., sending mail to the user's home address with a validation token for the user to provide to the web site). In another example, the physical validation factor may include biometric data (e.g., requiring the user to submit biometric data through a secure, authenticated device, such as a fingerprint reader).

Vault module 106 may identify the password vault in any suitable manner. For example, vault module 106 may identify the password vault by identifying an agent associated with the user account that enables the user account to use the password vault for logging in to Internet sites.

Returning to FIG. 3, at step 306 one or more of the systems described herein may determine, based at least in part on the login information for the third-party Internet site, that the user account corresponds to the physical person. For example, at step 306 determination module 108 may, as part of computing device 202 in FIG. 2, determine, based on login information 222, that user account 214 corresponds to user 230 (e.g., a unique individual).

Determination module 108 may determine that the user account corresponds to the physical person in any of a variety of ways. For example, determination module 108 may identify a weight assigned to the third-party Internet site (e.g., according to a predefined weighting scheme of the evidentiary value of well-known Internet sites). Determination module 108 may then apply the weight in a multi-factor determination of whether the user account corresponds to the physical person. The multi-factor determination may include any of a variety of additional factors. In some examples, one or more of the additional factors may include login information corresponding to one or more additional Internet sites within the password vault. For example, determination module 108 may search the password vault for high-value Internet sites (e.g., Internet sites that imply one or more physical validation factors). Determination module 108 may then assign a weight to each Internet site (e.g., based on the evidentiary value of the respective validation factors used by each Internet site). After applying the weight in the multi-factor determination, determination module 108 may determine, in the multi-factor determination, that a likelihood that the user account corresponds to the physical person exceeds a predetermined threshold.

In some examples, determination module 108 may determine that the user account corresponds to the physical person by comparing one or more Internet sites within the password vault with an assessment of one or more known Internet sites. For example, determination module 108 may identify a database of third-party Internet sites that require physical validation factors. Determination module 108 may then query the database to determine that the third-party Internet site requires the physical validation factor (e.g., that login access to the third-party Internet site implies physical validation). The database of third-party Internet sites may include any of a variety of types of Internet sites. For example, the database of third-party Internet sites may include financial service institution sites (e.g., for banks, credit card companies, lending companies, investment companies, etc.), commerce sites (e.g., for business partnerships, shopping, micropayments, etc.), governmental sites (e.g., for the Internal Revenue Service), and/or any other Internet site that requires physical validation factors for creating user accounts and/or allowing logins.

As mentioned earlier, in some examples, the password vault may include information indicating a number of times that a user of the user account has successfully logged in to the third-party Internet site. In these examples, determination module 108 may also account for the number of successful logins when determining whether the user account represents a physical person (e.g., a higher number of successful logins providing a stronger validation).

Using FIG. 4 as an example, determination module 108 may examine password vault 400 to determine that the user account corresponds to a physical person (e.g., "Joe Bloggs"). For example, determination module 108 may identify records 438, 440, and 448 as representing high-value Internet sites that require physical validation factors for creating accounts. Determination module 108 may also identify record 444 as a medium-value Internet site that requires weaker physical validation factors. Determination module 108 may also discount the evidentiary value of record 438 because the last attempt to log in to salliemae.com was unsuccessful (and because the last successful attempt was nearly two years prior to the last attempt). In some examples, determination module 108 may also account for the number of successful logins for records 438, 440, 444, and 448 and the last successful login attempts for records 438, 440, 444, and 448 (e.g., more recent successful login attempts being weighted more). Determination module 108 may then determine that the combined weight of records 438, 440, 444, and 448 exceed a predetermined threshold and, accordingly, determine that the user of the password vault represents a legitimate, physical person.

Determination module 108 may retrieve information from the password vault in any suitable manner. In some examples, determination module 108 may retrieve full records from the password vault. Additionally or alternatively, the password vault may be configured to allow limited information to determination module 108 (e.g., not providing usernames or passwords to determination module 108, but receiving a list of significant Internet sites from determination module 108 and returning a number of successful logins for the specified Internet sites to determination module 108).

Returning to FIG. 3, at step 308 one or more of the systems described herein may respond to the request with an indicator that the user account corresponds to the physical person. For example, at step 308 response module 110 may, as part of computing device 202 in FIG. 2, respond to request 212 with an indicator that user account 214 corresponds to user 230 (e.g., a unique individual).

The indicator may include any suitable information for validating the user account. For example, response module 110 may generate an authentication token. In this example, response module 110 may transmit the authentication token to the user account for submission by the user account to a validating system. Response module 110 may also transmit the authentication token to the validating system for verification of the user account. Additionally or alternatively, response module 110 may receive the authentication token from the validating system and relay the authentication token to the user account. In one example, a client associated with the user account (e.g., a web browser plug-in) may then submit the authentication token to a computing system requiring the validation information (e.g., the original requesting system). For example, the client may include the authentication token in a web form submission. The computing system requiring the validation information may then validate the authentication token (e.g., by querying a validation system with the authentication token). In some examples, the authentication token may include a one-time use token.

The system receiving the authentication token may use the authentication token for any of a variety of purposes. For example, the system may use the authentication token to secure access to an Internet resource and/or service for the user account. Additionally or alternatively, the system may use the authentication token to generate and/or modify a reputation assessment of the user account (e.g., by verifying the user account as corresponding to a physical person, the systems and methods described herein may facilitate greater trust and/or weight to be placed with the user account).

As explained above, by mining password vaults for evidence of successful logins to Internet sites that require strong validation techniques, the systems and methods described herein may effectively validate the authenticity of user accounts (e.g., that they represent physical people) without burdening users with requirements to repeat strong validation tests.

Figure 5:
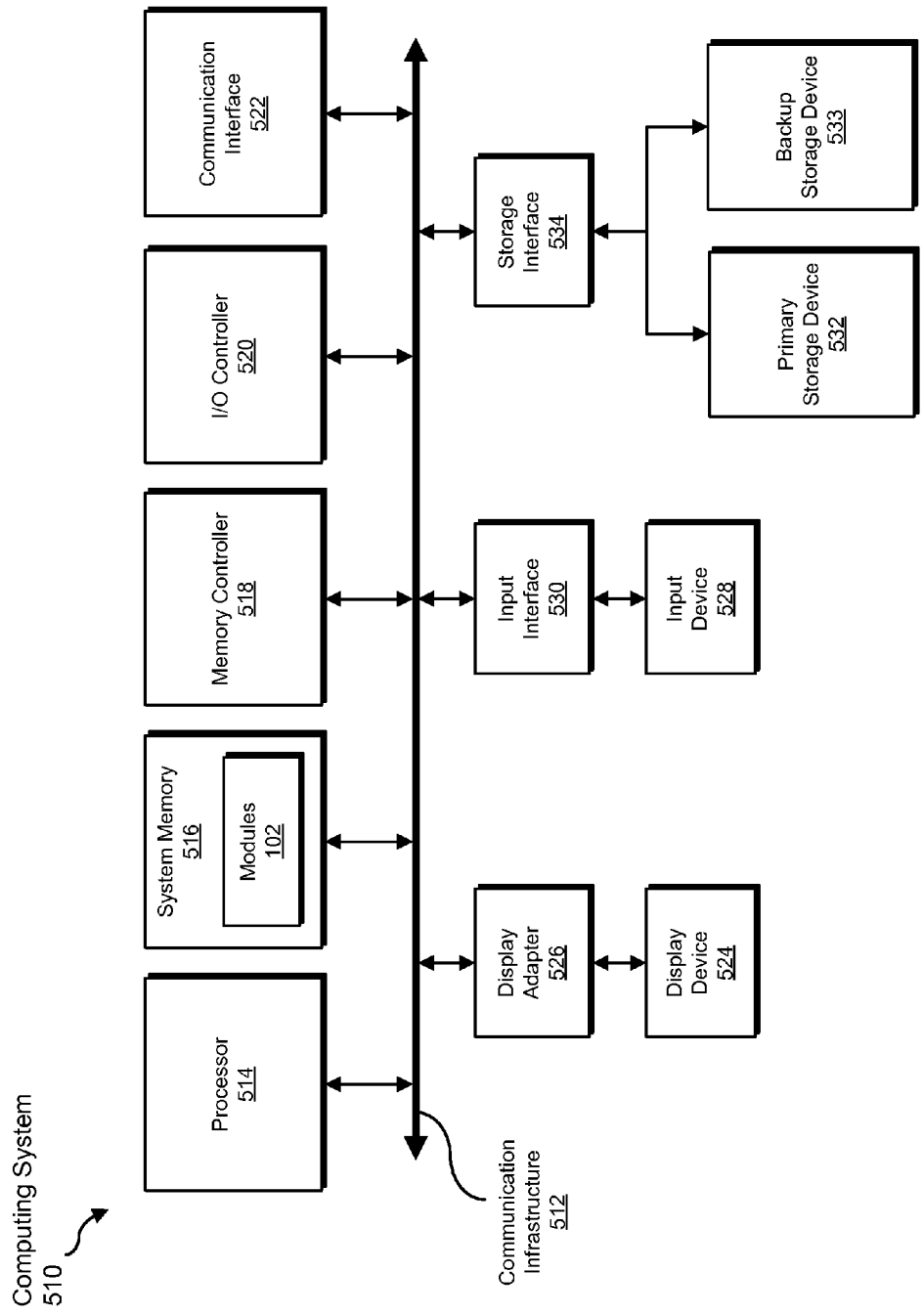
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, applying, querying, responding, and transmitting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
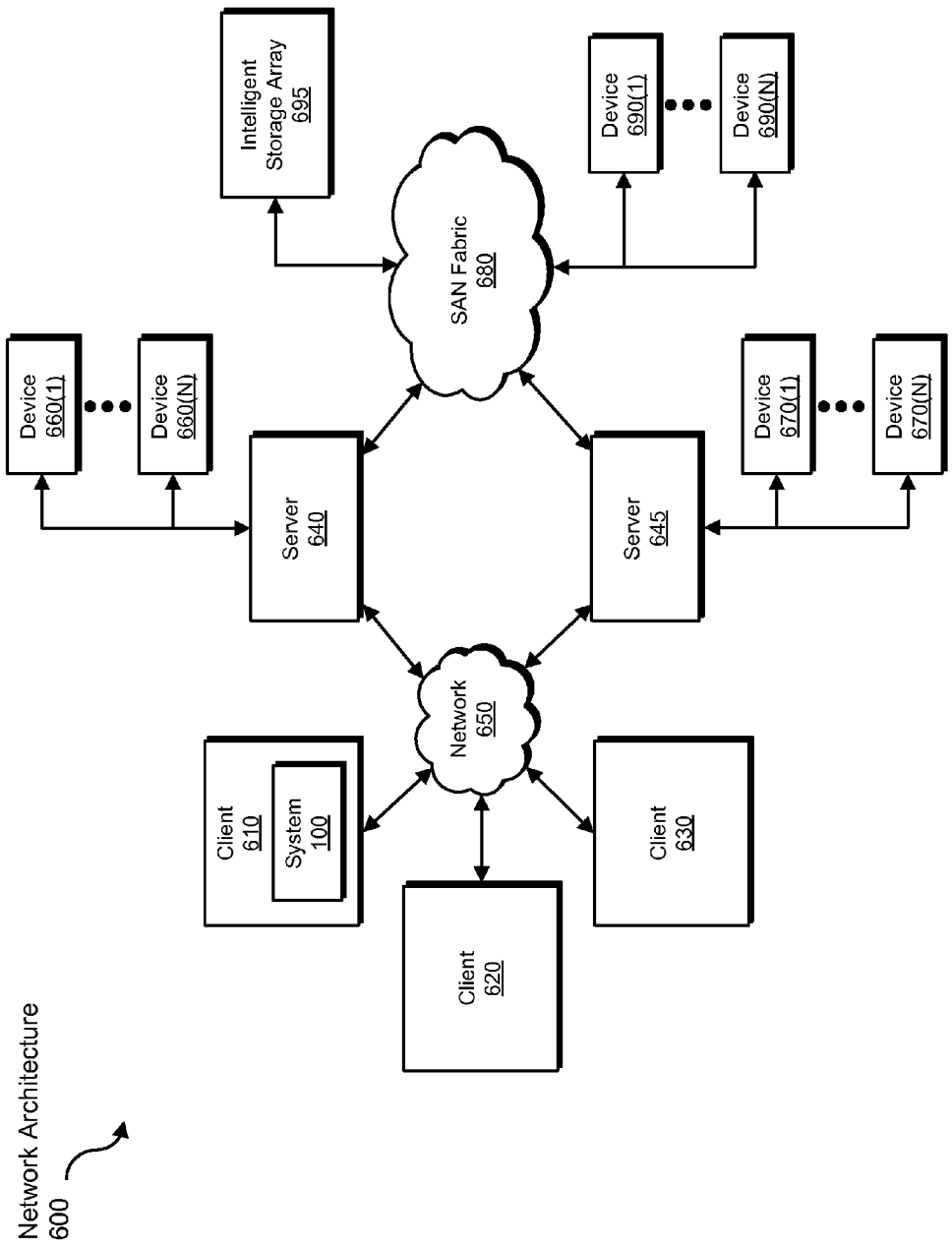
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, applying, querying, responding, and transmitting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for verifying user identities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for verifying user identities.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for verifying user identities, at least a portion of the method being performed by a computing device comprising at least one processor, the method comprising:

identifying a request from a requesting Internet site to ascertain whether an entity represented by a user account, via which the entity has attempted to access the requesting Internet site, corresponds to a physical person;

in response to the request:
identifying a password vault configured to store login information for at least one third-party Internet site for the user account, the third-party Internet site requiring a physical validation factor that confirms that the user account corresponds to the physical person in order for the entity to establish an account with the third-party Internet site;

inferring, based on the login information for the third-party Internet site stored in the password vault and based on the third-party Internet site requiring the physical validation factor, that the entity previously provided the physical validation factor to the third-party Internet site to establish the account with the third-party Internet site;

determining, based at least in part on inferring that the entity previously provided the physical validation factor to the third-party Internet site, and not based on direct input from the entity, that the user account corresponds to the physical person by:
identifying a weight assigned to the third-party Internet site;
applying the weight in a multi-factor determination of whether the user account corresponds to the physical person;
determining, in the multi-factor determination, that a likelihood that the user account corresponds to the physical person exceeds a predetermined threshold;

responding to the request with an indicator to the requesting Internet site that the user account corresponds to the physical person.

2. The computer-implemented method of claim 1, wherein the login information comprises information indicating that a user of the user account has successfully logged in to the third-party Internet site.

3. The computer-implemented method of claim 2, wherein the password vault is configured to reset the information indicating that the user of the user account has successfully logged in to the third-party Internet site when the login information changes.

4. The computer-implemented method of claim 1, wherein the login information comprises information indicating a number of times that a user of the user account has successfully logged in to the third-party Internet site.

5. The computer-implemented method of claim 1, wherein:
the indicator comprises an authentication token;
responding to the request comprises:
transmitting the authentication token to the user account for submission by the user account to a validating system;
transmitting the authentication token to the validating system for verification of the user account.

6. The computer-implemented method of claim 1, wherein the physical validation factor comprises at least one of:
credit card information;
in-person authentication;
phone number authentication;
a document scan;
a home address verification;
biometric data.

7. The computer-implemented method of claim 1, wherein determining, based at least in part on inferring that the entity previously provided the physical validation factor to the third-party Internet site, that the user account corresponds to the physical person comprises determining that the third-party Internet site requires the physical validation factor by:
identifying a database of third-party Internet sites that require physical validation factors;
querying the database to determine that the third-party Internet site requires the physical validation factor.

8. A system for verifying user identities, the system comprising:
an identification module, stored in memory, programmed to identify a request from a requesting Internet site to ascertain whether a user account, via which the entity has attempted to access the requesting Internet site, corresponds to a physical person;
a vault module, stored in memory, programmed to, in response to the request, identify a password vault configured to store login information for at least one third-party Internet site for the user account, the third-party Internet site requiring a physical validation factor that confirms that the user account corresponds to the physical person in order for the entity to establish an account with the third-party Internet site;
an inference module, stored in memory, programmed to infer, based on the login information for the third-party Internet site stored in the password vault and based on the third-party Internet site requiring the physical validation factor, that the entity previously provided the physical validation factor to the third-party Internet site to establish the account with the third-party Internet site;
a determination module, stored in memory, programmed to determine, based at least in part on inferring that the entity previously provided the physical validation factor to the third-party Internet site, and not based on direct input from the entity, that the user account corresponds to the physical person by:
identifying a weight assigned to the third-party Internet site;
applying the weight in a multi-factor determination of whether the user account corresponds to the physical person;
determining, in the multi-factor determination, that a likelihood that the user account corresponds to the physical person exceeds a predetermined threshold;
a response module, stored in memory, programmed to respond to the request with an indicator to the requesting Internet site that the user account corresponds to the physical person;
at least one physical processor configured to execute the identification module, the vault module, the inference module, the determination module, and the response module.

9. The system of claim 8, wherein the login information comprises information indicating that a user of the user account has successfully logged in to the third-party Internet site.

10. The system of claim 9, wherein the password vault is configured to reset the information indicating that the user of the user account has successfully logged in to the third-party Internet site when the login information changes.

11. The system of claim 8, wherein the login information comprises information indicating a number of times that a user of the user account has successfully logged in to the third-party Internet site.

12. The system of claim 8, wherein:
the indicator comprises an authentication token;
the response module is programmed to respond to the request by:
  transmitting the authentication token to the user account for submission by the user account to a validating system;
  transmitting the authentication token to the validating system for verification of the user account.

13. The system of claim 8, wherein the physical validation factor comprises at least one of:
credit card information;
in-person authentication;
phone number authentication;
a document scan;
a home address verification;
biometric data.

14. The system of claim 8, wherein the determination module is programmed to determine, based at least in part on inferring that the entity previously provided the physical validation factor to the third-party Internet site, that the user account corresponds to the physical person by determining that the third-party Internet site requires the physical validation factor by:
  identifying a database of third-party Internet sites that require physical validation factors;
  querying the database to determine that the third-party Internet site requires the physical validation factor.

15. A non-transitory computer-readable-storage medium comprising one or more computer-executable instructions that, when executed by at least one processor of a computing device, cause the computing device to:
  identify a request from a requesting Internet site to ascertain whether a user account, via which the entity has attempted to access the requesting Internet site, corresponds to a physical person;
  in response to the request:
    identify a password vault configured to store login information for at least one third-party Internet site for the user account, the third-party Internet site requiring a physical validation factor that confirms that the user account corresponds to the physical person in order for the entity to establish an account with the third-party Internet site;
    infer, based on the login information for the third-party Internet site stored in the password vault and based on the third-party Internet site requiring the physical validation factor, that the entity previously provided the physical validation factor to the third-party Internet site to establish the account with the third-party Internet site; determine, based at least in part on inferring that the entity previously provided the physical validation factor to the third-party Internet site, and not based on direct input from the entity, that the user account corresponds to the physical person by:
      identifying a weight assigned to the third-party Internet site;
      applying the weight in a multi-factor determination of whether the user account corresponds to the physical person;
      determining, in the multi-factor determination, that a likelihood that the user account corresponds to the physical person exceeds a predetermined threshold;
    respond to the request with an indicator to the requesting Internet site that the user account corresponds to the physical person.

16. The non-transitory computer-readable-storage medium of claim 15, wherein the login information comprises information indicating that a user of the user account has successfully logged in to the third-party Internet site.

17. The non-transitory computer-readable-storage medium of claim 16, wherein the password vault is configured to reset the information indicating that the user of the user account has successfully logged in to the third-party Internet site when the login information changes.

18. The non-transitory computer-readable-storage medium of claim 15, wherein the login information comprises information indicating a number of times that a user of the user account has successfully logged in to the third-party Internet site.

19. The non-transitory computer-readable-storage medium of claim 15, wherein:
the indicator comprises an authentication token;
responding to the request comprises:
  transmitting the authentication token to the user account for submission by the user account to a validating system;
  transmitting the authentication token to the validating system for verification of the user account.

20. The non-transitory computer-readable-storage medium of claim 15, wherein the physical validation factor comprises at least one of:
credit card information;
in-person authentication;
phone number authentication;
a document scan;
a home address verification;
biometric data.

* * * * *